J. Deere,
Making Plow-Irons,
N° 63,369. Patented Apr. 2, 1867.
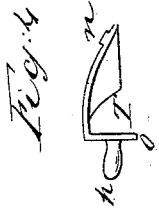
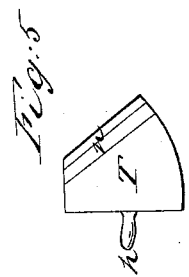
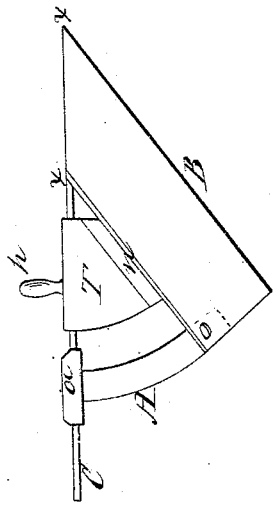
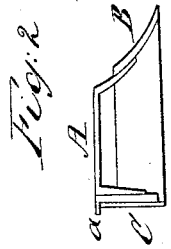
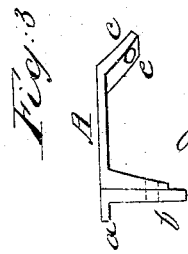
Witnesses
O. J. Dodge
H. B. Munn
Inventor
John Deere
By M. D. Dodge
his Attorney

United States Patent Office.

JOHN DEERE, OF MOLINE, ILLINOIS, ASSIGNOR TO DEERE & CO., OF SAME PLACE.

Letters Patent No. 63,369, dated April 2, 1867.

IMPROVED METHOD OF MAKING PLOUGHS.

*The Schedule referred to in these Letters Patent and making part of the same.*

TO ALL WHOM IT MAY CONCERN:

Be it known that I, JOHN DEERE, of Moline, in the county of Rock Island, and State of Illinois, have invented certain new and useful improvements in the Manufacture of Ploughs; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention I will proceed to describe it.

My invention has relation to the manufacture of ploughs made of steel or wrought iron, and consists in the construction and use of certain tools hereinafter described for the purpose of making the ploughs uniform in shape and style.

Figure 1 is a top plan view of the land-side and share, with the tools applied for welding the land-side and share together.

Figure 2 is a rear view of the same.

Figure 3, a view of the welding-brace detached; and

Figures 4 and 5 are views of the templet shown detached.

It is well known that the land-side and shares of this style of ploughs are the parts most subjected to wear; and that it is difficult in replacing them to give to them precisely the same angles and position which the originals had; and that if this be not done the efficiency of the plough is affected. In constructing new ploughs, also, it is found difficult, if not impossible, to so construct and weld these parts as to secure perfect uniformity in a large number of ploughs of the same size. And hence, while one plough gives entire satisfaction in its operation, another of the same lot fails to operate correctly or satisfactorily, owing to variation in the union of its parts. To remedy these difficulties, and provide a simple and sure means of constructing them with uniformity, is the object of my present invention.

In the drawings, B represents the share, and C the land-side, which, in ploughs of this character, are first formed in separate pieces of the required shape and size, and afterwards welded together along the line $x\ x$ of fig. 1. In order to secure these in their proper position, and hold them so while being welded, I construct and use the device represented in fig. 3, and which I denominate a welding-brace. This brace consists of a bar, A, having its right-hand end bent or curved, as shown, to exactly fit the under side of the share at its rear end, a hole, $e$, being made in the brace, corresponding with a similar hole in the share, by which it is firmly bolted thereto. At the opposite end the brace A is provided with a flange, $a$, at proper height to rest on the top of the land-side, as shown in fig. 1, and having a flange or arm, $b$, projecting downward at right angles to the flange $a$, to bear against the inside face of the land-side, this arm $b$ also being provided with a hole for bolting it firmly to the land-side. When the brace is securely bolted to the share and land-side their front edges are brought together in proper position for welding, as shown in fig. 1, and are then welded along the line $x\ x$. In order to be sure that the parts B and C are arranged at the proper angle relative to each other before being welded, and that they are retained in that position during the entire process of welding, I make use of the templet or try-square T. This templet consists of a piece of steel made in the form represented in figs. 4 and 5, the former being a rear end view, and the latter a top plan view. At the left-hand side it is provided with a vertical flange, $o$, which rests against the outer face of the land-side C, as shown in fig. 1. The body of it extends from the land-side across to the share, and is so curved that its extreme opposite edge shall fit under the upper edge of the share, as shown in fig. 1. A ridge, $n$, is formed along its upper face, as shown in figs. 1, 4, and 5, the outer edge of which fits accurately against the upper edge of the share B. A handle, $h$, is attached to the vertical flange $o$, with which to hold and apply it in use. The templet, being thus constructed, and sides arranged at the proper angles, is applied, as shown in fig. 1, the flange $o$ being held firmly against the land-side C, and the front end of the share moved in or out until its inner edge coincides perfectly with the outer edge of the ridge $n$, when the front ends of the share and land-side are welded together. If, during the hammering incident to the welding, the position of the parts becomes at all changed, which is always more or less likely to happen, it is at once detected by applying the templet T, as shown in fig. 1, and the necessary alteration made. By these means I am enabled to reduce the manufacture of this style of ploughs to a perfect system, and to construct them with a uniformity hitherto unattainable. So, too, when it becomes necessary to renew the share and land-side, or either of them, I am enabled to give to them the same position and angles which the originals had, and thus to make the plough the same as before. It will be understood that both the brace and the templet will vary in size with the various sizes of ploughs to be made.

Having thus described my invention, what I claim, is—

1. The welding-brace A, constructed and arranged for use in the construction of ploughs, substantially as and for the purpose set forth.

2. I claim the templet or test-plate T, when constructed and adapted for use in the manufacture of ploughs, substantially as set forth.

JOHN DEERE.

Witnesses:
ELSWORTH MAPES,
H. O. WHIPPLE.